Oct. 12, 1948.            A. R. DE MATTOS              2,451,156
              PROCESS AND APPARATUS FOR PRODUCING
                      ALCOHOL BY FERMENTATION
                        Filed June 19, 1945
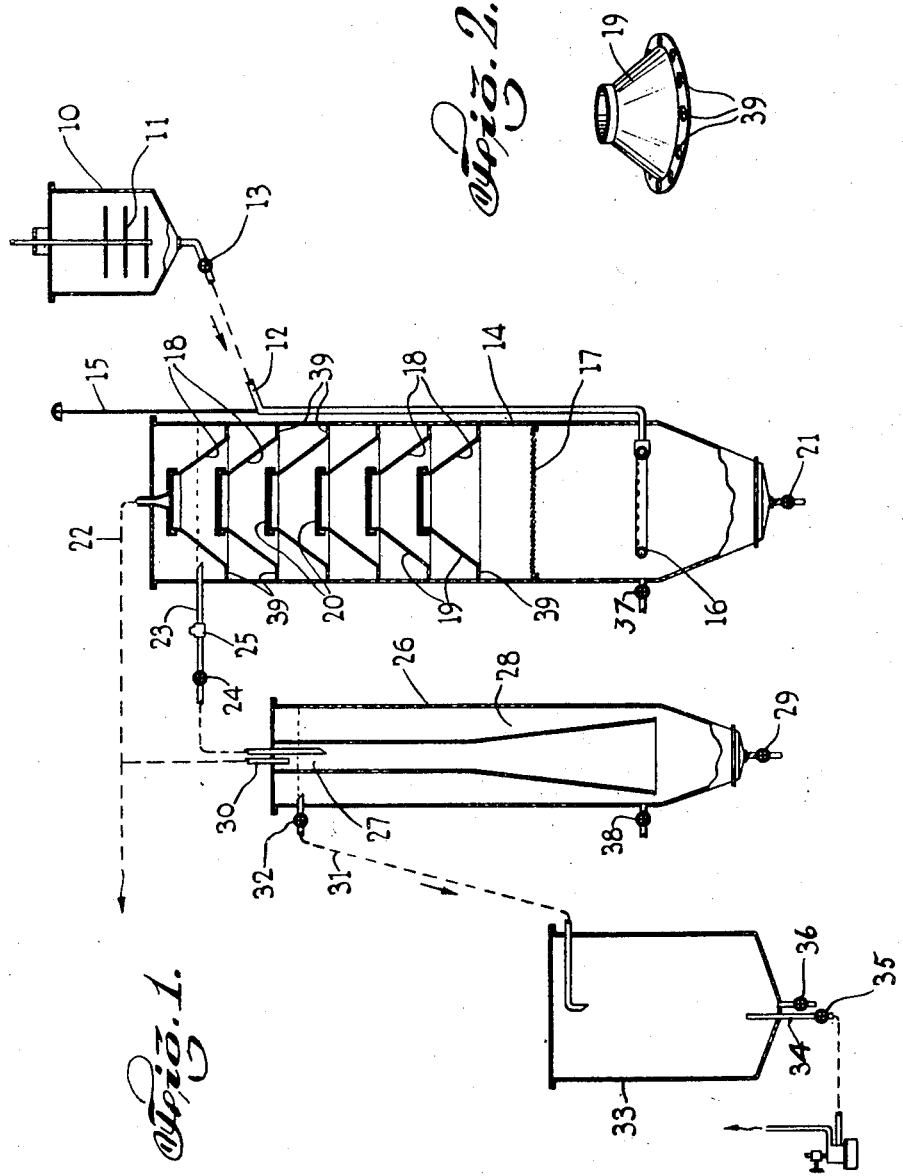
INVENTOR.
Annibal Ramos de Mattos
BY
ATTORNEYS Patented Oct. 12, 1948

2,451,156

UNITED STATES PATENT OFFICE 2,451,156

PROCESS AND APPARATUS FOR PRODUCING ALCOHOL BY FERMENTATION

Annibal Ramos de Mattos, Recife, Brazil

Application June 19, 1945, Serial No. 600,243
In Brazil June 19, 1944

12 Claims. (Cl. 195—141)

This invention relates to a process and apparatus for yeast fermentation and, more particularly, for producing alcohol by fermentation.

Commercially, alcohol is customarily produced by a batch or a modified batch process. In such processes the yeast necessary to convert the nutrient medium or wort into alcohol must be grown on the wort or on an outside nutrient medium. Yet as the conversion of the wort to alcohol takes place and the concentration of alcohol increases, the medium becomes toxic to the yeast. As a result, the alcohol ultimately present in high concentration kills a certain portion of the yeast, and the wort consumed in the production of this yeast is lost. Additionally, in such processes the concentration of yeast and its contact with the nutirent medium is seldom best adapted for optimum rate of alcohol conversion.

In the production of alcohol by conventional fermentation processes, it is usually necessary to kill or prevent the growth of bacteria which are deleterious to the propagation of the yeast or impede the conversion of the nutrient medium to alcohol. These deleterious bacteria are controlled either by subjecting the wort to heating at sterilization temperatures or by the introduction of chemical bactericides such as sulfuric acid, hydrochloric acid, fluorides, copper sulfate, and the like. It is also known that nutrients suitable for conversion to alcohol by fermentation, particularly cheaper nutrients such as low grade sugar, seldom contain all the elements necessary for the nutrition and propagation of the yeast which convert the nutrient into alcohol. As a result, the conventional nutrient medium must be complemented by the addition of so-called stimulants such as the various mineral salts including, for instance, sulfates and nitrates of ammonia, calcium superphosphates, and the like, or organic substances such as urea, malt, peptone, and the like.

The known commercal processes of producing alcohol by yeast fermentation may be divided roughly into four types; namely, progressive filling, division, continuous feeding, and a fourth process in which the yeast is recovered and re-used in subsequent fermentation vats.

In the first-mentioned process a group of vats is placed in series and fermentation initiated in one of the vats. When the fermentation has reached a desired point, a portion of the fermenting wort in the first vat is transferred to a second vat to initiate the fermentation therein and so on for any desired number of vats.

In the second-mentioned process the contents of one vat is used for the purpose of inoculating other vats. For instance, after a group of vats has been used for fermenting wort to alcohol, one of the group is not discharged but is retained for the purpose of distribution to the vats which have been discharged for the purpose of initiating the fermentation of fresh wort.

The third-mentioned continuous feeding process is a very old process introduced by Guillaume, involving inoculating a multiplicity of fermentation vats from a culturing vat.

The fourth process is of more recent origin and was patented by Melle and Boinot. In this last-mentioned process the pH of the fermenting wort is carefully controlled to approximate a pH of 3. When the fermentation is nearly complete, the partially spent wort and yeast are passed into a centrifuge where the yeast is recovered in the form of a liquid containing a high concentration of yeast. This liquid is used for the purpose of initiating the fermentation of a new charge of wort. This latter process has a number of disadvantages involving, as it does, the necessity for controlling pH of the fermentation mass and requiring the addition of conventional stimulants and the like used in other fermentation processes. The centrifuging device involves added equipment costs. The process makes possible some saving in fermentation equipment but not nearly so much as is possible in accordance with my continuous process described in detail hereinafter.

Now I have discovered a process and an apparatus for producing alcohol from conventional nutrients by yeast fermentation which overcomes many of the disadvantages of prior art procedures and eliminates the necessity for adding stimulants, antiseptics, and other chemical agents to the nutrients.

It is a principal object of my invention to produce improved yields of alcohol from conventional nutrient media.

Another object of my invention is to provide a method and apparatus wherein the concentration and the conditions of propagation of the yeast are maintained throughout the fermentation process under conditions especially well adapted for conversion of wort to alcohol, thereby materially shortening the fermentation period.

A further object of my invention is to provide a continuous process for producing alcohol by yeast fermentation in the sense that one footing of yeast serves for continuing fermentation indefinitely with a continuously or intermittently replenished supply of wort or nutrient medium; the yeast cells being used and reused.

Yet another object of my invention is to save the expense incident to providing seed yeast or footings, stimulants, antiseptics, and like additional agents as is customarily necessary in the production of alcohol by fermentation.

Still another object of my invention is to provide a process wherein a given production of alcohol can be provided with lower equipment costs.

An additional object of my invention is to provide an apparatus and method wherein deleterious bacteria are segregated from the yeast during the fermention process.

It is a special object of my invention to provide an apparatus which segregates dead yeast cells developed during the fermentation process and provides means for their easy removal from the fermentation apparatus.

Other objects, features, and purposes of my invention will be apparent from the more detailed description which follows.

In my fermentation process the wort is preferably passed in a continuous stream through a predetermined path. The raw wort is introduced continuously or by charges into a zone of a fermentation apparatus wherein a concentration of yeast is provided, especially well adapted for the conversion of the raw wort to alcohol, and passed thence through a series of other zones wherein the yeast is maintained at a concentration suitable for continued conversion of the fermenting wort to alcohol until a zone is reached where the conversion of the wort to alcohol is completed or substantially completed. The spent wort and alcohol is then removed and the alcohol separated by distillation from the spent wort by conventional procedures.

My invention is best understood when described in connection with apparatus used in the practice thereof.

In the drawings, Figure 1 shows a view in elevation of my fermentation apparatus. Figure 2 shows a perspective view of part of a baffle device used in the apparatus of Figure 1.

Referring particularly to Figure 1, a storage tank 10 is provided with an agitator 11. The storage tank 10 is connected through conduit 12, controlled by valve 13, to the lower portion of a fermentation vat 14. Conduit 12 is provided with vent valve 15 and the end thereof extending into the vat 14 is provided with a circular perforated pipe or ring 16. In vat 14, 17 is a wire screen, and 18 represents baffles composed of conical sections 19 and loose-fitting optional caps 20. A valve 21 is provided in the bottom of vat 14 to remove the dead yeast, and a conduit 22 is provided in the top of vat 14 to remove gases developed during the fermentation.

Vat 14 is connected by conduit 23, controlled by valve 24 and provided with the vent valve 25, to a second fermenting and settling vat 26. Conduit 23 leads into the top of an inner chamber 27 of vat 26 connected at its lower extremity to an outer chamber 28 of vat 26. Vat 26 is likewise provided with a valve 29 in the bottom thereof, and a conduit 30 leading from the top of inner chamber 27 joins conduit 22 leading from the top of vat 14.

Vat 26 is connected through a conduit 31, controlled by valve 32, to the top of a collection tank 33. Collection tank 33 is provided with a conduit 34 containing control valve 35 to convey the alcohol and spent wort to distillation apparatus (not shown). Tank 33 is also provided with a valve 36 for cleaning sediment or other impurities from the tank.

Fermentation vats 14 and 26 are provided with taps 37 and 38, respectively, for sampling the ingredients therein.

In Figure 2, the conical section 19 of the baffle 18 is shown to have perforations 39 in its flange.

In the operation of my process and apparatus, conventional wort such as cane juice, molasses, sugar, or any other saccharified substances prepared in accordance with any of the existing procedures flows by gravity from the storage tank 10 into the first fermentation vat 14. The flow of the wort through the conduit 12 is regulated by means of valve 13, and its distribution with the yeast in the bottom or lower portion of vat 14 is effectuated by means of perforated ring 16. The concentration of yeast in the lower section of vat 14 below the fine wire screen 17 is adjusted to a high concentration especially well adapted for rapidly converting the raw wort into alcohol, and it is in this area where the most vigorous fermentation takes place. The concentration of yeast most appropriate for alcohol conversion in this area or zone may be provided initially from outside sources such as by preparing a footing from a suitable mother culture or the process may be initiated by inoculating a wort and gradually introducing the raw wort into the vat 14 until the growth of yeast has reached the desired concentration before beginning the continuous process.

The reduction in the specific gravity of the wort due to fermentation, the evolved carbon dioxide, and the constant flow of the raw wort into vat 14 tend to cause the flow of fermenting wort and yeast towards the top of vat 14. The passage of the fermenting wort and carbon dioxide gas through the screen 17 and past the various baffles 18 separating the various reaction zones impedes the flow of the yeast towards the top of the tank and causes portions of it to settle back towards the bottom of vat through orifices 39 provided in sections 19. Dead yeast is separated in the same manner and due to its greater density settles into the bottom of vat 14, where it is easily removed through valve 21. Additionally, the decrease in specific gravity of the wort due to increased concentration of alcohol also tends to cause the yeast to settle back towards the bottom of vat 14.

The passage of the wort and carbon dioxide gas through the centrally disposed well or path provided by the various baffles, i. e., the cones or inverted funnels upwardly converging to centrally disposed passages connecting the superimposed zones or chambers, causes great turbulence centrally within the various zones of reaction and thereby creates peripheral downflow of low velocity which allows precipitation of the yeast from the lighter or ascending wort and brings the yeast into intimate contact with the unconverted wort. By adjusting the number and types of baffles or other devices impeding the flow of the wort, gas, and yeast, the concentration of yeast in the various reaction zones can be regulated such that the concentration of yeast in those zones is especially well adapted for continuing the conversion of the particular wort therein to alcohol.

When the wort has reached the top of vat 14, the greater proportion thereof has been converted into alcohol. After reaching the level of the conduit 23, this partially fermented wort flows by gravity through the conduit to another reaction zone which is less turbulent, namely, the upper portion of inner chamber 27 of fermenting and settling vat 26. The fermenting wort flows downwardly through inner chamber 27 through the funnel-shaped lower portion of the chamber, around the end thereof, and up through the outer chamber 28, wherein the liquid is relatively quiescent. The change of direction of flow from the inner chamber 27 to the outer chamber 28 causes a precipitation of most of the yeast cells still in the fermenting liquor. By the time the fermenting wort has reached the level of the conduit 31, the wort is substantially spent by being converted into alcohol.

Due to forces of gravity and the shape of the inner chamber 27, most of the yeast cells in vat 26 collect in the lower portion of the vat and in inner chamber 27. As a result, substantially all the unconverted wort is fermented into alcohol before it flows up through the outer chamber 28, and most of the evolved gases pass up to the top of inner chamber 27, thereby leaving the liquid in outer chamber 28 substantially free of yeast and marked turbulence.

The spent wort and alcohol flow by gravity through conduit 31 into the top of collection tank 33, where any dead yeast settles out in the bottom of the tank. The spent wort and alcohol are withdrawn by means of conduit 34 containing control valve 35, and introduced into appropriate distillation apparatus (not shown).

Each of the fermenting vats 14 and 26 and the collection tank 33 is provided with valves, 21, 29, and 36, respectively, in the bottom thereof for withdrawing sediment and dead yeast.

I have found that by correlating the rate of flow of the wort through my apparatus with the nature and the number of devices separating the various zones of fermentation, I can maintain optimum or substantially optimum conditions for conversion of the wort to alcohol throughout the fermentation cycle. In this way the loss of yeast due to the toxic effect of the alcohol is reduced to a minimum, and the wort usually consumed in producing other yeast cells to replace those killed is available for conversion to alcohol, thereby making my process highly efficient and my yield of alcohol from a given nutrient medium exceptionally high.

The gases formed in the fermentation of the wort pass through conduits 22 and 30 from whence they may be collected and used for known purposes.

The illustrative embodiment shown herein involves a single storage tank feeding one initial fermentation vat. It is obvious, however, that a single storage tank may be used to fill a multiplicity of fermentation vats and that a plurality of initial fermentation vats may be used to feed a single fermentation and settling vat or vice versa.

While conventional nutrients for alcohol fermentation may be used in my process, I have found that my process has the advantage of permitting the use of exceptionally low grade nutrient media including the lowest grade sugar produced in cane sugar refining.

I have also discovered that contrary to general practice, it is not necessary to use stimulants in my fermentation process. Apparently this is due to the fact that substantially ideal fermentation conditions are maintained throughout the fermentation process. Moreover, it is not necessary to sterilize or disinfect the wort before introducing it into the initial fermentation vat used in my process. This is probably due to the fact that the carbon dioxide gases carry the bacteria to the upper portion of the initial fermentation vat where they have little or no toxic effect on the yeast propagation.

Due to the very short time required for the fermentation in my process, the cost of the apparatus used therein for any given volume of alcohol production is lower than that necessary for use in producing alcohol in accordance with conventional practices.

It will be understood that the embodiments of my invention described and illustrated herein are only representative of the principles of my invention and the procedures used therein. Various modifications in the illustrative embodiments of my invention can be made without departing from the spirit of the invention or its scope which is defined in the appended claims.

I claim:

1. A process for producing alcohol from a nutrient medium by fermentation with yeast comprising flowing the nutrient medium into a main zone of high yeast concentration and actively fermenting the same with yeast to alcohol in said main zone, continuing the fermentation by flowing the fermenting medium successively upwardly through a series of superimposed zones of decreasing yeast concentration until a zone of high alcohol concentration and low yeast concentration is reached, precipitating yeast from said medium progressively as it ascends through said zones, and returning yeast so precipitated to said main zone, and removing alcohol-containing nutrient medium from said zone of high alcohol concentration.

2. A process for producing alcohol from a wort by fermentation with yeast comprising flowing the wort into a lower zone of a fermentation system containing a high yeast concentration and actively fermenting the same with yeast to alcohol in said zone, continuing the fermentation by flowing the wort upwardly through a series of superimposed zones impeding the passage of yeast through said zones whereby the concentration of yeast is diminished from zone to zone until a zone of high alcohol concentration and low yeast concentration is reached, and removing the alcohol, yeast, and partially spent wort from said zone of high alcohol concentration.

3. A process for producing alcohol from wort by fermentation with yeast in a continuous process involving a predetermined path comprising flowing the wort into a zone containing a high concentration of yeast and actively fermenting the same with yeast to alcohol in said zone, continuing the fermentation by flowing the fermenting wort channeled centrally and upwardly through successive superimposed zones containing yeast therein, diminishing in concentration from zone to zone until the zone is reached wherein a major portion of the wort is converted to alcohol, and removing the spent wort and alcohol from said last-mentioned zone.

4. A process of producing alcohol from wort by yeast fermentation which comprises flowing wort into a lower zone of a fermentation system of high yeast concentration and actively fermenting the same with yeast in said zone, continuing the fermentation by first flowing the fermenting wort upwardly through a series of superimposed intermediate zones of successively lower yeast concentration and finally through a substantially quiescent zone of optimum alcohol concentration and minimum yeast concentration.

5. A process for fermenting yeast-fermentable substances which comprises introducing wort into the lower portion of a system containing yeast therein in a high concentration, flowing the fermenting wort upwardly through a series of superimposed zones and progressively precipitating yeast cells from said upwardly flowing wort until a zone of low yeast concentration is reached, and withdrawing the worth of low yeast concentration from said zone.

6. A process for fermenting wort with yeast which comprises introducing the wort into the lower portion of a fermentation system containing yeast therein in a high concentration, flowing the fermenting wort oriented centrally upwardly through said system and precipitating yeast from said upwardly flowing wort until a zone of low yeast concentration is reached, flowing the precipitated yeast substantially peripherally downwardly to areas of higher yeast concentration, and withdrawing the wort from said zone of low yeast concentration.

7. A continuous process for producing alcohol from wort by yeast fermentation which comprises flowing wort into the bottom portion of a unit of a fermentation system containing a high concentration of yeast, flowing the fermenting wort upwardly to the top portion of said unit through a series of superimposed zones, channeling the flow of the wort towards the center portion of said unit as it flows through said zones, impeding the passage of the yeast from zone to zone, flowing the partially fermented wort from the top portion of said unit to the top portion of a second unit of said system, flowing the fermenting wort downwardly through said second unit and then upwardly again to the top thereof, and withdrawing the spent wort and the alcohol from the top portion of said second unit.

8. A process for producing alcohol from wort by fermentation comprising flowing the wort during fermentation in a continuous stream through a predetermined path including the following steps: (1) flowing the raw wort in the lower portion of a fermentation unit provided with a high concentration of yeast, (2) flowing the wort upwardly and centrally through said unit at a rate which permits a conversion of the major portion of the wort to alcohol, (3) flowing the partially fermented wort into the upper portion of a second fermentation unit, (4) flowing the partially fermented wort to the bottom portion of said second unit and again to the top thereof, and (5) withdrawing the spent wort and alcohol from the top of said second unit.

9. In a fermentation system, a vertical fermentation vat, an inlet for introducing a wort into the bottom portion of said vat, obliquely upwardly oriented separating devices extending from the vicinity of the sides of said vat towards the center thereof dividing the vat into fermentation zones and impeding the flow of wort from the bottom portion of the vat to the top portion thereof, an outlet to withdraw the fermentation gases from the top of said vat, an outlet and conduit means to convey wort from the top of the vat to an inner chamber of a second vat communicating in its lower portion with another chamber thereof, an outlet for withdrawing fermentation gases from the top of said inner chamber, and an outlet to convey the fermented wort from the top portion of said outer chamber.

10. In a fermentation system, a vertical fermenting vat, conduit and inlet means for introducing wort into the bottom portion of said vat, baffles extending from the vicinity of the sides of said vat towards the center thereof, an outlet for withdrawing fermentation gases from the top of said vat, an outlet and conduit means near the top of said vat to convey wort to the top portion of an inner chamber of a second vertical vat, said chamber having a flared lower extremity in communication with an outer chamber of said second vat, an outlet for withdrawing fermentation gases from said second vat and an outlet for withdrawing fermented wort from the top of said outer chamber.

11. In a vertical fermentation vat for yeast fermentation, an inlet for the introduction of wort, an outlet above said point of introduction for withdrawal of the fermented wort, horizontally but upwardly oriented baffle means between said bottom portion and said outlet centrally directing the flow of the yeast and impeding the flow of yeast upwardly in the vat, and conduits through which impeded and precipitated yeast can flow downwardly to the bottom portion of said vat.

12. In a vertical fermentation vat for yeast, an inlet and conduit means near the bottom portion thereof for the introduction of wort, outlets above said point of introduction for the withdrawal of wort and fermentation gases, and baffles between said bottom portion and said outlets extending from the vicinity of the walls of said vat towards the center thereof impeding the flow of yeast upwardly in the vat having substantially peripheral conduits through which impeded and precipitated yeast can flow to the bottom portion of said vat.

ANNIBAL RAMOS DE MATTOS.

REFERENCES CITED

The following references are of record in the file of this patent:

UNITED STATES PATENTS

| Number | Name | Date |
| --- | --- | --- |
| 2,083,348 | Schaller et al. | June 8, 1937 |
| 2,146,326 | Bergins et al. | Feb. 7, 1939 |
| 2,155,134 | Karsch | Apr. 8, 1939 |
| 2,272,261 | Bergman | Feb. 10, 1942 |

Certificate of Correction

Patent No. 2,451,156.  October 12, 1948.

ANNIBAL RAMOS DE MATTOS

It is hereby certified that errors appear in the printed specification of the above numbered patent requiring correction as follows:

Column 1, line 17, for "nutirent" read *nutrient*; column 5, line 33, after the word "valves" strike out the comma; column 7, line 11, claim 5, for "worth" read *wort*; column 8, line 59, list of references cited, for "Schaller" read *Scholler*; line 61, for "Apr. 8, 1939" read *Apr. 18, 1939*;

and that the said Letters Patent should be read with these corrections therein that the same may conform to the record of the case in the Patent Office.

Signed and sealed this 11th day of January, A. D. 1949.

[SEAL]

THOMAS F. MURPHY,
*Assistant Commissioner of Patents.*